United States Patent [19]
Edgar et al.

[11] Patent Number: 5,897,807
[45] Date of Patent: Apr. 27, 1999

[54] RETHERMALIZATION PASS THROUGH OVEN SYSTEM

[75] Inventors: Richard H. Edgar, Chelmsford, Mass.; Larry M. Engebritson, Cedar Rapids, Iowa; Mary J. Heitzman, Shreveport, La.; J. Scott Petty, Englewood, Colo.; Nelson J. Ferragut, Williamsburg, Iowa

[73] Assignee: Amana Company, L.P., Amana, Iowa

[21] Appl. No.: 08/925,351

[22] Filed: Sep. 8, 1997

[51] Int. Cl.⁶ .................................................. H05B 6/78
[52] U.S. Cl. ............................................................ 219/700
[58] Field of Search .................................... 219/684–704

[56] References Cited

U.S. PATENT DOCUMENTS

| | | | |
|---|---|---|---|
| 4,956,530 | 9/1990 | Koch et al. | 219/701 |
| 5,011,042 | 4/1991 | Bunce et al. | 219/150 |
| 5,025,132 | 6/1991 | Fortmann et al. | 219/401 |

FOREIGN PATENT DOCUMENTS 403282126  12/1991  Japan .................................... 219/705

Primary Examiner—Teresa Walberg
Assistant Examiner—Jeffrey Pwu
Attorney, Agent, or Firm—Tobor & Goldstein, LLP

[57] ABSTRACT

A pass through oven system using a microwave oven with doors and a conveyor belt passing through the oven cavity. A sensor system detects the food item on the conveyor belt and identifies the food item. A controller in response to the sensor system moves the conveyor so that the food item is positioned within the cavity of the microwave oven, automatically engages the oven for a preset duration depending upon the identity of the food item and then moves the conveyor to remove the food item from the cavity.

10 Claims, 6 Drawing Sheets

RETHERMALIZATION PASS THROUGH OVEN SYSTEM

FIELD OF THE INVENTION

The present invention is a pass through oven system for use in the commercial or fast food industry and in particular a pass through microwave oven system. The present invention relates to a microwave oven with doors having a conveyor belt passing through the oven cavity for moving a food item to a target area within the oven cavity and removing the food item from the oven cavity after a heating or rethermalization sequence is completed. A sensor system detects the food item on the conveyor belt and identifies the food item. A controller in response to the sensor system moves the conveyor to position the food item at the target area, automatically energizing the oven for a particular duration depending on the identity of the food item and then moves the conveyor to remove the rethermalized food item from the oven cavity.

BACKGROUND OF THE INVENTION

In the commercial or fast food restaurant business it is common practice to pre-prepare various food items in anticipation of customer demand. However, it is also desirable that each customer receive the ordered food item in an appropriate warm and palatable condition. To facilitate this goal, many commercial or fast food operations precook at least a portion of the various food items on the menu and upon receiving an order from a customer, heat or rethermalize the prepared portion, complete the assembly of the final food item and deliver it to the customers. The heating or cooking or rethermalization typically requires the operator to place the precooked food item into a conventional microwave oven and then select an appropriate intensity and duration setting. Such a system is labor intensive and is conducive to operator error. If the food item is heated for a unnecessary long period of time the final product may be overcooked or soggy either of which diminishes its general acceptability to the customer. If the food item is heated for a period of time that is too short, the final product may be undercooked or not warm which also diminishes its general acceptability to the customer. Thus, the prior known systems rely upon operator discretion in selecting the appropriate intensity and duration for the heating of each food item. Since the intensity and duration of the heating is at the operator's discretion it is difficult to assure consistent quality of food items to the customers. In addition, the individual heating process is both labor intensive and time consuming which both increases the cost and delays the delivery of the food item to the customer.

There are known microwave ovens which use conveyor belts to deliver the food item within the oven cavity. However, these systems do not have doors on the microwave oven which requires the oven to be sufficiently large to prevent microwave energy from escaping or require special chokes to contain the microwave energy. These known systems also require operator interface with the oven to set the appropriate intensity and duration of each cook cycle. Accordingly, it would be desirable to have a pass through oven system which identifies each food item to be rethermalized, uses a conveyor belt to properly position each food item within the oven, automatically sets the cooking cycle of the oven to correspond to the identified food item and then removes the food item after rethermalization.

SUMMARY OF THE INVENTION

The present pass through oven system comprises a microwave oven having a cavity and a pair of doors, a conveyor system with a belt which passes through the oven cavity, a sensor system for detecting a food item on the conveyor belt and identifying the food item and a controller to operate the system and provide various safety functions. While in the preferred embodiment the conveyor system uses a belt, any type of conveyance could be used in place of a belt. The sensor system detects the position of the food item along the conveyor belt relative to the center or target area of the oven cavity and identifies the food item. The controller comprises a microprocessor and relative circuitry to receive information, operate the system and perform various safety functions.

In the preferred embodiment, an operator, usually the store manager, enters a separate time duration into the microprocessor memory for each food item to be identified. Of course, the operator can also enter a separate intensity level for each food item or the memory can be preprogrammed with a set of intensity levels and times for various food items. The sensor system comprises three optical sensors positioned in front of the microwave oven. The first optical sensor detects the presence of the food item on the conveyor belt and send a signal to the controller which initiates the beginning of the sequence. A second optical sensor positioned at the entrance to the microwave oven detects when the food item is about to enter the oven and sends another signal to the controller. The coordination between the activation of the first and second optical sensor confirms that a food item is actually present on the conveyor belt as opposed to the detection of a transient or fake reading at the first optical sensor and determines the distance that the food item must travel to properly position the food item at a target area within the microwave oven cavity. A third optical sensor positioned at the entrance to the microwave oven identifies the food item and sends an appropriate signal to the controller.

Door closure sensors send signals to the controller to indicate that the doors are properly closed before initiation of the rethermalization sequence. If either of the door sensors indicate non-closure to the controller, then the controller moves the conveyor a short distance to remove whatever is blocking door closure. In most instances of non-door closure, the door has closed on a seam in the conveyor belt and a slight movement of the belt removes the obstruction.

After the identified food item to be rethermalized is positioned at the target point and the oven doors are properly closed, the controller initializes the oven for a preset 100% intensity level and for the selected duration corresponding to the identified food item. Of course, intensity levels other than 100% could be present or selected based on the identified food item. After the microwave oven shuts off, the controller opens the oven doors and moves the conveyor belt advancing the rethermalized food item from the oven cavity. The rethermalized food item is now combined with other ingredients to complete the ordered food item, if necessary, and then the ordered food item is presented to the customer.

BRIEF DESCRIPTION OF THE DRAWINGS

Other advantages of the invention will become apparent upon reading the following detailed description and your reference to the accompanying drawings, in which.

Figure 1:
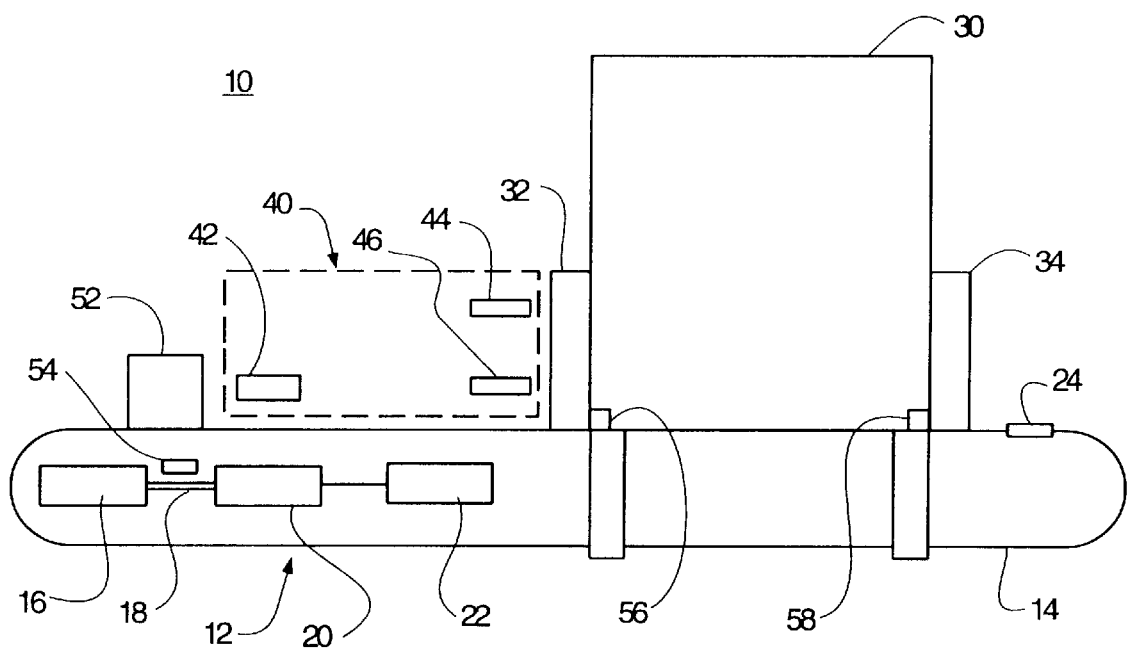
FIG. 1 is a diagrammatic representation of the pass through oven system of the present invention.

While the invention is susceptible to various modifications and alternative forms, a specific embodiment thereof has been shown by way of example in the drawings and will herein be described in detail. It should be understood, however, that the invention is not intended to be limited to the particular form disclosed. On the contrary, the applicant's intention is to cover all modifications, equivalents and alternatives falling within the spirit and scope of the invention as defined by the appended claims. It should also be understood that the drawings are not necessarily to scale and that the embodiments are sometimes illustrated by graphic symbols, diagrammatic representations and fragmentary views. In certain instances, details which are not necessary for an understanding of the present invention or which render other details difficult to perceive may have been omitted.

DETAILED DESCRIPTION

FIG. 1 illustrates in block diagram form the rethermalization pass-through oven system 10 of the present invention. The system 10 comprises a typical conveyor system 12 comprising a conveyor belt 14 connected by a typical interface structure 16 to a shaft 18 of a motor 20 and a driver circuit 22. The conveyor belt 14, interface 16, shaft 18 motor 20 and driver 22 are standard components well known to those of ordinary skill in the field and are illustrated in block diagram form for simplicity. The conveyor belt 14 is a closed loop with the ends spliced together at seam or joint 24. In the preferred embodiment, the conveyor belt 14 passes through a microwave oven 30. While the preferred embodiment uses a microwave oven, any type or kind of oven which is controllable by a microprocessor or microcontroller can be used. The microwave oven 30 has a first or front door 32 and a second or rear door 34. A sensor system 40 is positioned downstream from the microwave oven 30 and in the preferred embodiment comprises three photo eyes or sensors 42, 44 and 46. Each sensor 42, 44 and 46 provides a signal to a microprocessor 50, refer to FIG. 2. The sensor system 40 functions to identify a food item 52 and its position on the conveyor belt 14 relative to the center of the microwave oven 30. While in the preferred embodiment three photo sensors are used any number and/or type of sensor can be used to identify the food item by one or more characteristics of the food item. For example the sensor unit 40 can identify the size [either height or length or both] of the food item or it can identify the color of the wrapper for the food item or it can identify markings on the wrapper or container holding the food item such as a bar code or other indicator. The system 10 also includes a shaft sensor or encoder 54 to count the number of rotations of the shaft 18 of motor 20. Any shaft sensor well known to those of ordinary skill in the field can be used. The shaft sensor 54 provides a pulse signal representative of each revolution of the shaft 18 of the motor 20 to the microprocessor 50 which corresponds to the movement of the conveyor belt 14. Door sensors 56 and 58 are placed relative to the front door 32 and the rear door 34 respectively. Any well known door sensor which determines whether the door is properly closed can be used. Each sensor 56 and 58 provides a signal to the microprocessor 50.

Figure 2:
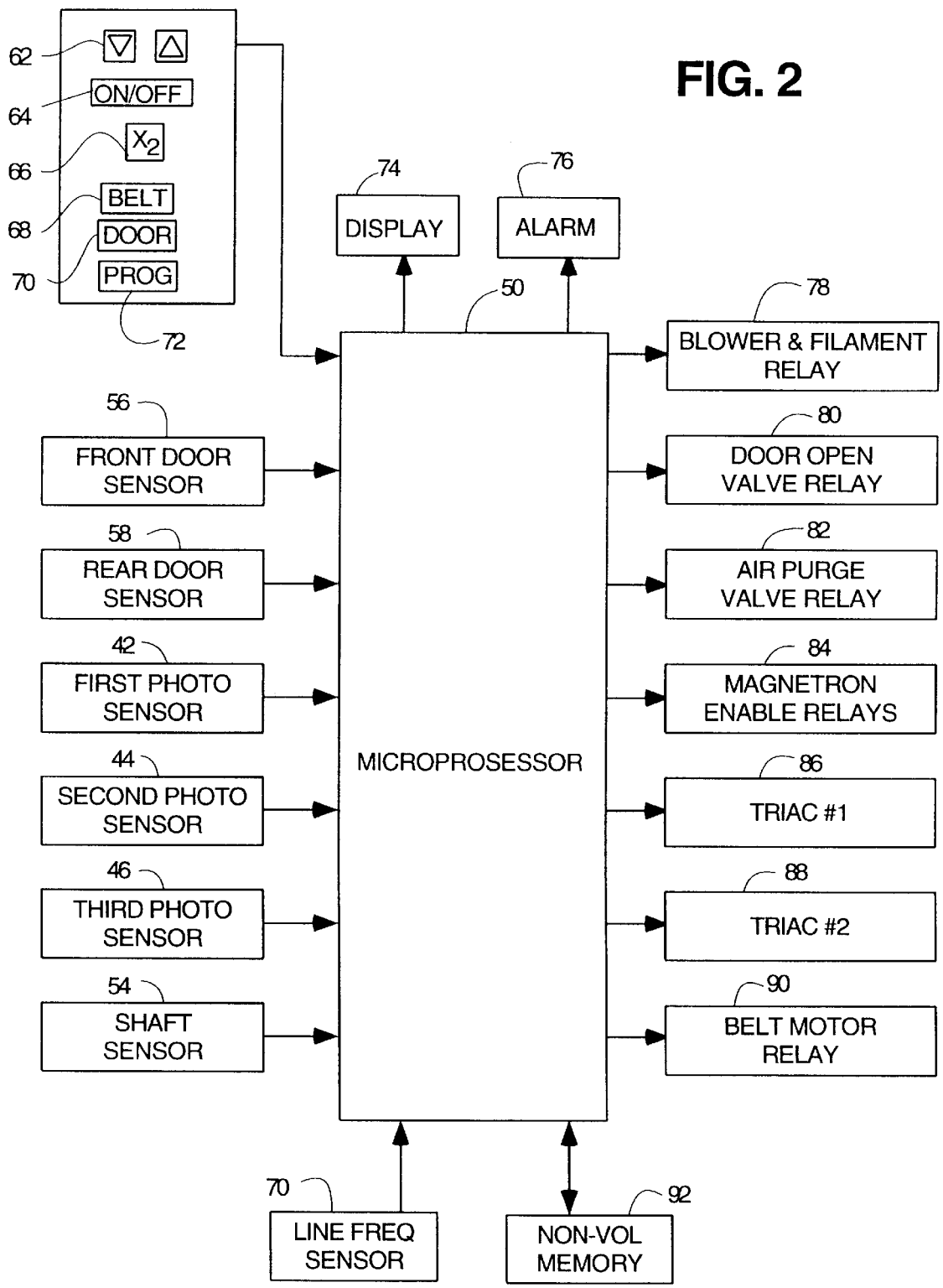
FIG. 2 is a block diagram of the inputs and outputs of the microprocessor used in the pass through oven system of the present invention.

FIG. 2 is a block diagram of the inputs and outputs of the microprocessor 50 for the pass through oven system 10. In the preferred embodiment the microprocessor 50 is a Motorola No. MC68HC05B16, however any microprocessor or microcontroller capable of performing the functions described herein can be used. A keypad 60 typically positioned on the microwave oven 30 provides a variety of signals to the microprocessor 50 as described latter herein. While the keypad 60 can have any number of keys to perform various functions, in the preferred embodiment there are a pair of slew keys 62, an on/off key 64, a $X_2$ key 66, a belt key 68, a door key 70 and a program key 72. The microprocessor 50 also receives a signal from the front door sensor 56, the rear door sensor 58, the first photo sensor 42, the second photo sensor 44, the third photo sensor 46, the shaft sensor 54 and a line frequency sensor 70. The microprocessor 50 also receives and sends data to a non-volatile memory 92 as explained hereinafter. The microprocessor 50 sends an output signal to a display 74, an audible alarm 76, a blower and filament relay 78, a door open valve relay 80, a air purge valve relay 82, magnetron enable relays 84, a first triac 86, a second triac 88 and a conveyor belt motor relay 90.

Figure 3:
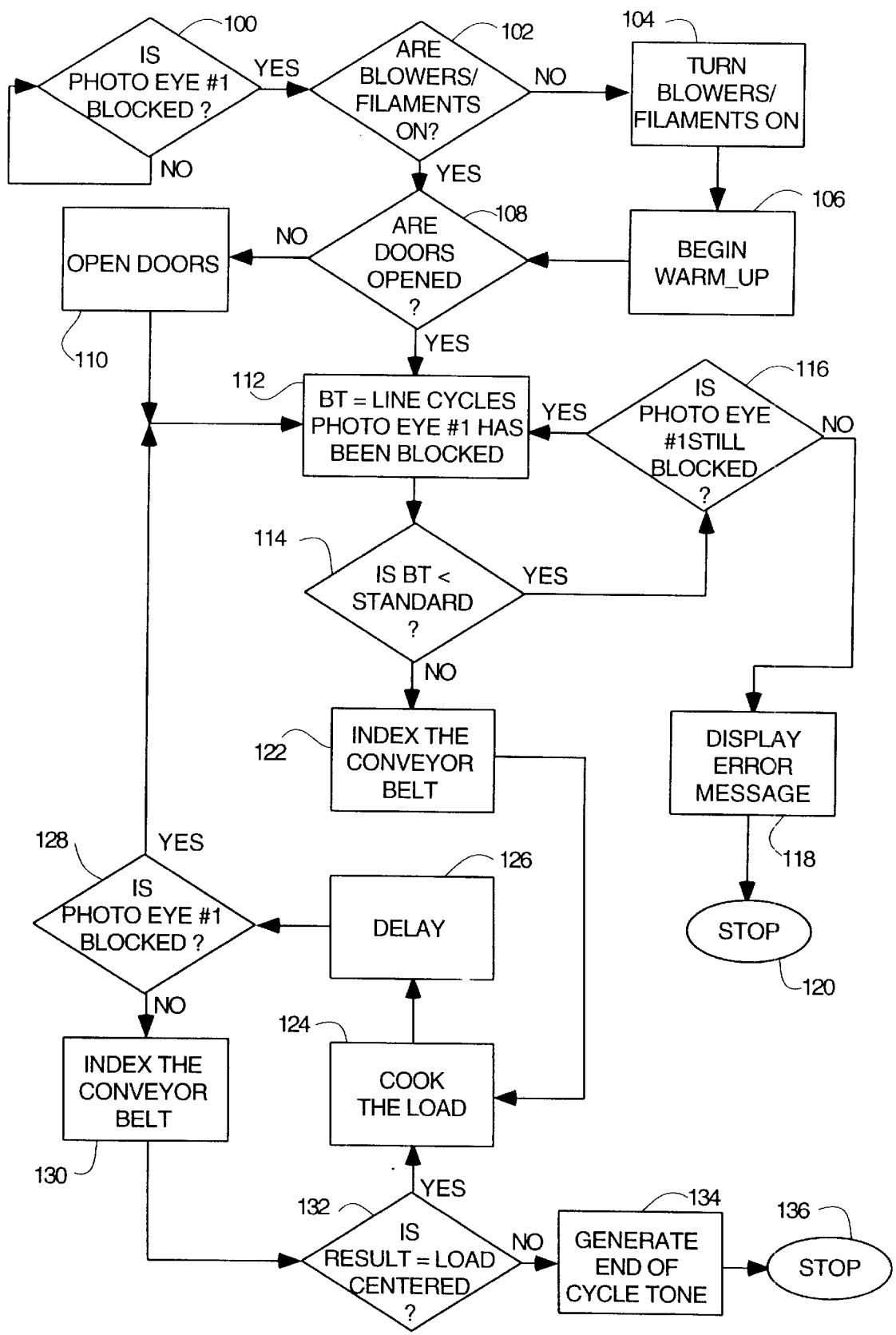
FIG. 3 is a flow chart for the automatic cooking cycle or sequence under the control of the microprocessor used in the pass through oven system of the present invention.

FIG. 3 is a flowchart for of the automatic cooking cycle or sequence under control of the microprocessor 50. At step 100, the first photo sensor 42 sends a signal to the microprocessor 50 when a food item 52 blocks the sensor. If the first photo sensor 42 is not blocked the system merely idles. If the photo sensor 42 is blocked then at step 102 the microprocessor 50 determines if the blowers and filaments of the oven are on. If the blowers and filaments are not on, then at step 104 the blowers and filaments are turned on and at step 106 the system delays a sufficient amount of time to allow for an appropriate warm up. After the appropriate warm up delay or if the blowers and filaments are on as determined in step 102, then at step 108 the process determines whether the doors to the oven are open. If either the front door 32 or the rear door 34 are not open, the doors are opened at step 110. Next at step 112 BT is set equal to the number of line cycles that the photo sensor 42 has been blocked. As would be well known to one of ordinary skill in the field the process begins counting the line cycles as soon as the photo sensor 42 is blocked. Now at step 114, BT is compared to a preselected standard or number. While any number can be used in the preferred embodiment 15 line cycles is used as the standard. If BT is less than the standard, the process at step 116 determines if the photo sensor 42 is still blocked. If the photo sensor 42 is no longer blocked then at step 118 an error message is displayed. The display of an error message as referred to herein can be a signal to the audible alarm 76 or the visual display 74 or both. The error message could be a number or symbol meaning the "photo sensor blocked and then unblocked before the belt started moving". Finally the process stops at step 120. If BT is equal to or greater than the standard in step 114, then at step 122 the conveyor belt is indexed.

Figure 4:
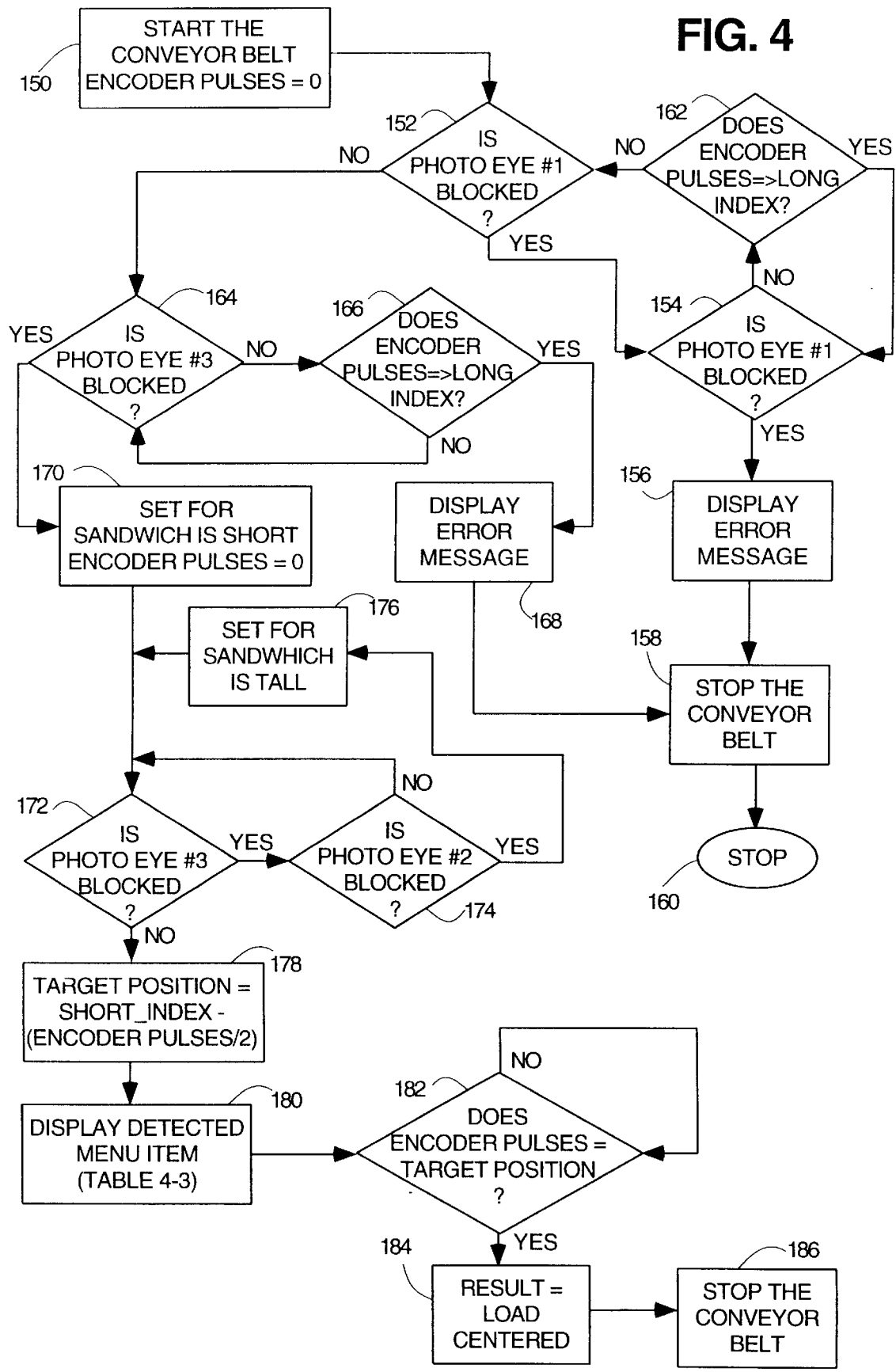
FIG. 4 is a flow chart for the indexing of the conveyor belt under the control of the microprocessor used in the pass through microwave oven system of the present invention.

Turning to FIG. 4 the flow chart for indexing the conveyor belt is shown. At step 150, the conveyor belt is started and the number of shaft encoder pulses is set equal to zero. At step 152, the process determines if the photo sensor 42 is still blocked. If the photo sensor 42 is still blocked, then at step 154 the process determines if photo sensor 46 at the entrance to the oven cavity is blocked. If the photo sensor 46 is blocked, then the photo sensor 42 has been blocked too long for a proper operation so at step 156 an error message is displayed and at step 158 the conveyor belt is stopped and finally at step 160 the process stops. If the photo sensor 46 at step 154 is not blocked, then at step 162 the number of shaft encoder pulses is compared to a standard, referred to as the "long index". The standard is the length of time or number of encoder pulses necessary for the conveyor to move the food item from photo sensor 42 to the center of the microwave oven. If the conveyor belt has not been operating a period of time equal to the long index the process returns to step 152. If the conveyor belt has been operating for a period of time equal to or greater than the long index the process returns to the steps 156 through 160.

Now, if the photo sensor 42 at step 152 is not blocked, then at step 164 the process determines if photo sensor 46 is blocked. If the sensor 46 is not blocked and the system is operating correctly then the food item 52 is on the conveyor belt between sensor 42 and sensor 46. Accordingly at step 166, the process determines if the shaft encoder pulses or length of time the conveyor belt has been moving is equal to or greater than the long index. If the encoder pulses equal or are greater than the long index while photo sensor 46 is not blocked then at step 168 an error message is displayed such as no load detected and at step 158 the conveyor is stopped and at step 160 the process stops. If the encoder pulses at step 166 are less than the long index then the process returns to step 164 to determine if the photo sensor 46 is blocked.

If photo sensor 46 is blocked at step 164, then at step 170, the process sets the oven controls for one type of food item e.g., a short sandwich and the number of encoder pulses are set equal to zero. At step 172 the system determines if photo sensor 46 is still blocked. If photo sensor 46 is blocked, then at step 174 the process determines if photo sensor 44 is blocked. If photo sensor 44 is not blocked then the process loops back to step 172 until photo sensor 46 becomes unblocked. If photo sensor 44 is blocked at step 174, then at step 176 the oven is reset for a second food item, e.g., a tall sandwich.

Now, when the photo sensor 46 is unblocked at step 178 the target position for the food item 52, the center of the oven cavity, is set equal to a standard, referred to as the short index, minus the encoder pulses divided by two. The short index is the distance between photo sensor 44 and the center of the cavity. At step 180 the identified food item is displayed. Next at step 182 the system checks to determine if the encoder pulses equal the target position. If not, the system merely idles and if so, then the result at step 184 is that the load is at the target area or centered. Now the conveyor is stopped at step 186.

Figure 5:
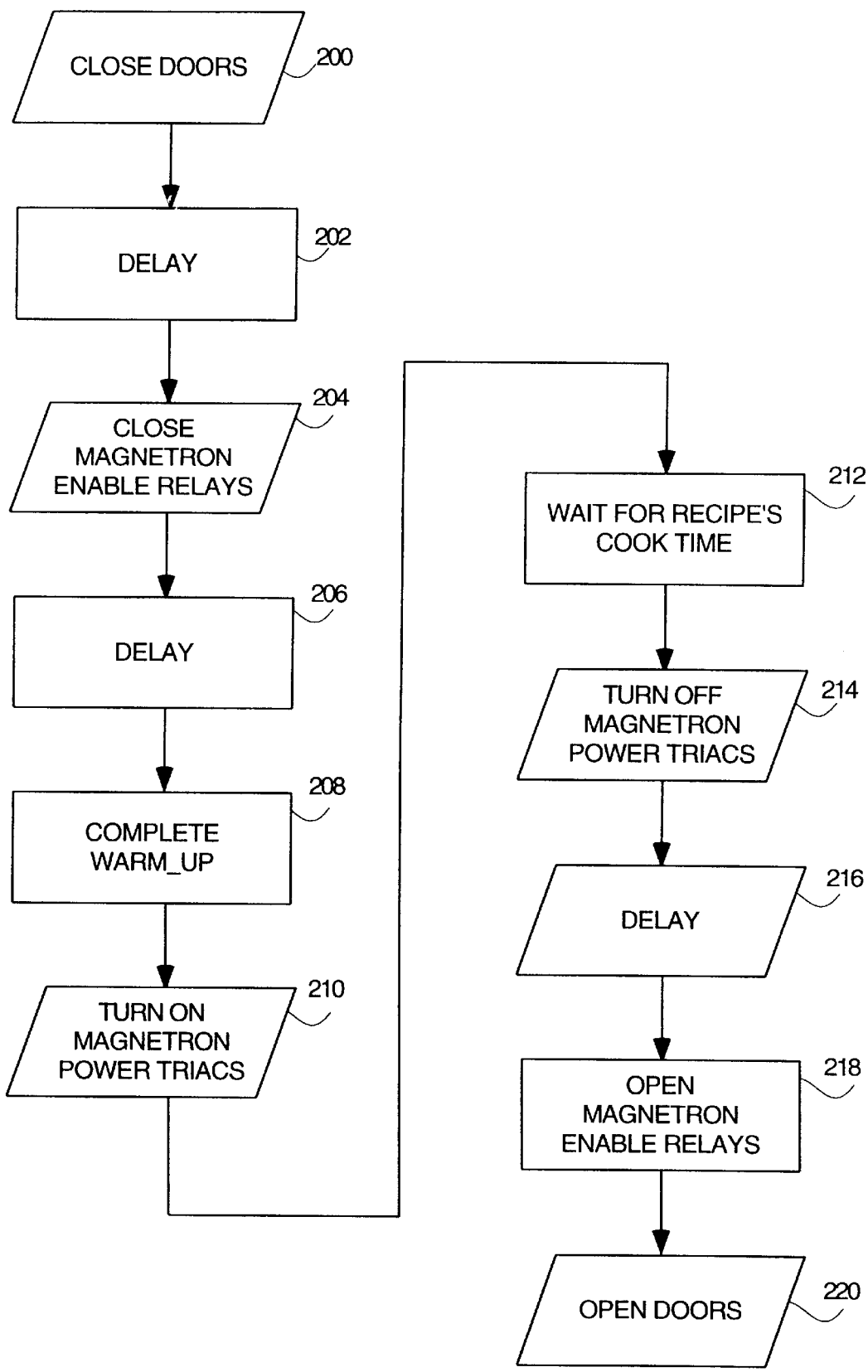
FIG. 5 is a flow chart for the rethermalization cycle or sequence under the control of the microprocessor used in the pass through oven system of the present invention.

After the conveyor belt stops at step 186 the process initiates the heating or cooking or rethermalization of the food item or load at step 124 in FIG. 3. The details of the cooking sequence flow chart is shown on FIG. 5. The first step in the cooking sequence is to close the oven doors 32 and 34 at step 200. This is described in detail with reference to FIG. 6 discussed hereinafter. After the doors are properly closed at step 202 a delay is provided. Next, the microprocessor 50 closes the magnetron enable relays at step 204 and a delay is provided at step 206. Now, a warm-up is completed at step 208 and at step 210 the magnetron power triacs are turned on. Next the appropriate cook time for the identified item is provided to the microwave oven 10 at step 212. After the cook time has elapsed the magnetron power triacs are turned off at step 214. A delay is provided at step 216 and thereafter the magnetron enable relays are opened at step 218. Now, the doors 32 and 34 of the oven 30 are opened at step 220.

Now referring to FIG. 3, the process provides a delay at step 126 and at step 128 determines if the photo sensor 42 is blocked. If the photo sensor 42 is blocked then another food item has been placed on the conveyor belt 14 and the process returns to step 112 and repeats the process described above. If the photo sensor 42 is not blocked at step 128 then the conveyor belt is indexed at step 130 as set forth in FIG. 4. Now, if the food item or load is centered at step 132 then the process returns to step 124 of FIG. 3. If the food item or load is not centered at step 132, then an end of cycle tone is generated at step 134 and the process ends at step 136.

Figure 6:
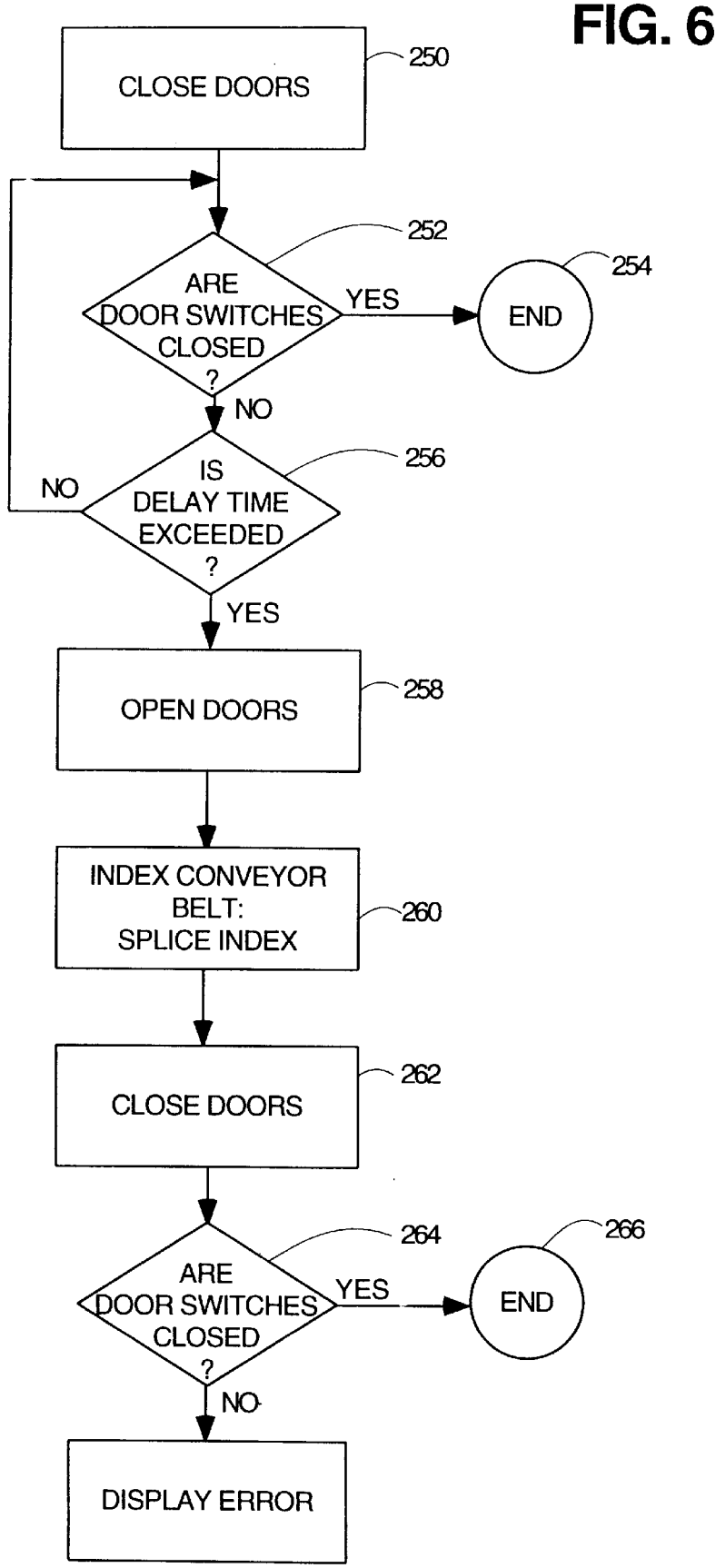
FIG. 6 is a flow chart for the door closure cycle or sequence under the control of the microprocessor used in the pass through oven system of the present invention.

FIG. 6 is a flow chart for the door closure sequence. At step 250 a signal is sent to close doors 32 and 34. If the door switches 56 and 58 are closed at step 252 indicating that the doors 32 and 34 are closed then at step 254 the process ends. If the door switches 56 and 58 are not closed, then at step 256 the process checks to determine if an amount of time referred to as "door jam" has passed in the preferred embodiment this is ¼ sec. If the time hasn't been passed the process returns to step 252 to determine if the door switches are closed. If the time has been passed, the process proceeds to step 258 and opens the doors 32 and 34.

Now at step 260, the conveyor belt is advanced a predetermined distance referred to as "splice index". This distance is sufficient to move the conveyor belt a short distance which is adequate to move the splice or seam in the conveyor belt away from the doors 32 and 34 in case it is the splice in the conveyor belt that is preventing door closure. At step 262, the doors 32 and 34 are closed. Next at step 264 the process determines if the door switches are closed. If they are, then the process ends at step 266. If either door switch is not closed at step 264 then at step 268 an error is displayed.

The system variables which determine the operational characteristics of the oven are stored in the non-volatile memory 92 shown in FIG. 2. The system variables are accessible by the user or operator through the programming modes. In the preferred embodiment, the microprocessor 50 has two sets of default values for the system variables stored in ROM. One set of default values for the system variables is used when the line cycles are measured at 50 Hz and the other set of default values is used when the line cycles are measured at 60 Hz. Of course, other arrangement for using different sets or a single set of default values for system variables is well within the ability of one of ordinary skill in this field.

The microprocessor or controller 50 has several operating modes, namely Initialization Mode, Automatic Mode, Automatic Cooking Mode, Manual Mode, Manual Cooking Mode, Program Selection Mode, Recipe Selection Mode, Cook Time Programming Mode, Error Display Mode, Splice Index Programming Mode, Short Index Programming Mode, Long Index Programming Mode, System Variable Selection Mode, System Variable Programming Mode, Purge Duration Programming Mode and Reset Default Values Mode. Each of the operating modes is described in greater detail below.

In both the Automatic and Manual Modes if the system has not performed any operations for a predetermined period of time (sleep seconds) then the magnetron filaments and blower fans are automatically turned off and the doors are automatically closed. This is referred to as the sleep state. In contrast, in the ready state the magnetron filaments and the blower fans are on and the doors open. The operator can disable the automatic sleep function by setting both the high and low bytes of the sleep system variable to zero as described below in reference to the System Variable Programming Mode.

In both the Automatic and Manual Modes the system will automatically purge the pressurized air tanks to remove moisture from the compressed air. When the blower fans and magnetron filaments are on, each time the doors are driven a predetermined number of times (purge door cycles) the system opens the purge valve for a predetermined number of line cycles (purge duration). The operator can disable this feature by setting the purge door cycles system variable or the purge duration system variable to zero. When the blower fans and magnetron filaments are off, each time a predetermined number of seconds (purge seconds) pass without any oven activity, the system opens the purge valve for purge duration line cycles. The operator can disable this function by setting both the high and low bytes of the purge system variable or the purge duration system variable to zero.

Whenever an error condition is detected by the system a predetermined error message is displayed and/or an error tone generated. In this situation the oven also aborts normal operation and reverts to the Automatic Mode or the Manual Mode whichever occurred most recently.

Whenever the doors are opened, the system checks to confirm that at least one of the door switches has opened within a predetermined number of line cycles (door jam). If neither door switch opens within the allotted time, the control will display an error message.

As indicated above the system has various operating modes. The general method of entry into each operating mode and a description of the action performed in that mode is set forth hereinafter. The initialization mode is entered into by applying power to the system. Next all oven components are turned off and a message indicating that no errors have occurred since the system was plugged in is displayed. If the non-volatile memory 92 is corrupted, then the process copies the default system variables from the microprocessor ROM to RAM and from the ROM to the non-volatile memory 92. If the non-volatile memory 92 is not corrupted then the process copies the system variables from the non-volatile memory to the microprocessor RAM. If the microprocessor 50 is not programmed correctly the process displays a error message and/or generates an error tone. If the microprocessor 50 is properly prepared, the software version number is displayed, the breakfast menu is selected and the program goes to the Automatic Mode. Now, in the Automatic Mode the process displays the currently selected menu. The options are Breakfast and Lunch. In the Automatic Mode if the input is from photo sensor 42, then the process goes to the Automatic Cooking Mode. If the input is from the slew keys 62, then the breakfast menu or the lunch menu is selected. If the on/off key 64 is depressed and the blower fans and magnetron filaments are on, then the process is placed in the sleep state. If the on/off key 64 is depressed and the blower fans and magnetron filaments are off, then the process is placed in the ready state. If the $X_2$ key 66 is depressed then the process is placed in the Manual Mode which is described below. If the belt key 68 is depressed, the process indexes the conveyor belt as described above. If the Door key 70 is depressed, the doors 32 and 34 open or close depending on their position when the door key 70 is depressed. If the program key 72 and the $X_2$ key 66 are depressed together, then the process is placed in the Program Select Mode, described below with the selected program being the Cook Time Programming Mode.

In the Manual Mode, the display shows the currently selected recipe which in the preferred embodiment, is either the cook time for a short breakfast item (system variable name is breakfast 1) or the cook time for a tall breakfast item (system variable name is breakfast 2) or the cook time for a short lunch item (system variable name is lunch 1) or the cook time for a tall lunch item (system variable name lunch 2). The inputs and the function or action performed by the system is the same as described for the Automatic Mode except if the $X_2$ key 66 is depressed and the process is in the ready state then the system is placed in the Manual Cooking Mode, otherwise the process is placed in the ready state.

In the Program Selection Mode, the display shows the currently selected programming mode. The options are as follows: Recipe Selection Mode (CO), Error Display Mode (ER), Splice Index Programming Mode (SP), Short Index Programming Mode (Sh), Long Index Programming Mode (Lo), System Variable Programming Mode (SV), Purge Duration Programming Mode (PR) or Reset Default Values Mode (dF). The possible inputs and the corresponding function or action performed by the process are set forth below. If the slew keys 62 are depressed one of the programming modes described above is selected. If the on/off key 64 is depressed and the doors 32 and 34 are closed and the selected programming mode is SP, Sh or Lo then open the doors 32 and 34. Thereafter, the process is placed in the selected programming mode. If the door key 70 is depressed the process returns to the mode it was in prior to entering the Program Selection Mode, either the Automatic Mode or the Manual Mode.

In the Recipe Selection Mode, the display shows the currently selected recipe. If the slew keys 62 are depressed, either a breakfast or lunch menu item is selected. If the on/off key 64 is depressed, the process is placed in the Cook Time Programming Mode. If the Door key 70 is depressed the process returns to the mode it was in prior to entering the Program Selection Mode, either the Automatic Mode or the Manual Mode. If the Program key 72 is depressed, the process returns to the Program Selection Mode.

In the Cook Time Programming Mode, the display shows the current proposed cook time for the selected recipe. In the preferred embodiment, the cook times range from 1.0 seconds to 10 seconds in increments of 0.1 seconds and from 10 seconds to 60 seconds in increments of 1.0 seconds. Of course, other cook times and increments can be used. If the slew keys 62 are depressed, the process either increments or decrements the prepared cook time to the next value. If the on/off key 64 is depressed, the process variable for cook time stored in RAM is updated with the new proposed cook time, the non-volatile memory 92 is updated based upon the RAM and the process is placed in the Recipe Selection Mode. If the Door key 70 is depressed the process returns to the mode it was in prior to entering the Program Selection Mode, either the Automatic Mode or the Manual Mode. If the Program key 72 is depressed, the process returns to the Program Selection Mode.

In the Error Display Mode, the display shows the most recently recorded error message. If the Door key 70 is depressed the process returns to the mode it was in prior to entering the Program Selection Mode, either the Automatic Mode or the Manual Mode. If the Program key 72 is depressed, the process returns to the Program Selection Mode.

In the Splice Index Programming Mode, upon initial entry into the Splice Index Programming Mode, the display first shows "SP" for one second and then shows the actual Splice-Index Value. For the remainder of this mode, unless otherwise noted, the display shows the proposed new value for the Splice-Index System Variable. If the slew keys 62 are depressed the process increments or decrements the proposed value for the eight bit Splice-Index System Variable by one. If the on/off key 64 is depressed, the RAM system variable with proposed Splice-Index is updated and the non-volatile memory based upon the RAM is also updated and the process goes to the Program Select Mode. If the $X_2$ key 66 is depressed the display shows "SP" for one second and then shows the proposed value or the Splice-Index System Variable. If the belt key 68 is depressed the conveyor belt Splice-Index encoder pulses are indexed. If the door key 70 is depressed the process returns to the mode which it was originally in prior to entering the Program Select Mode, either the Automatic Mode or the Manual Mode. If the program key 72 is depressed the process returns to the Program Select Mode.

Upon initial entry into the Short Index Programming Mode, the display first shows "Sh" for one second and then shows the high byte of the actual Short-Index System Variable for one second and finally shows the low byte of the actual Short-Index System Variable. For the remainder of this mode, unless otherwise noted, the display shows the low byte of the proposed new value for the Short-Index System Variable. If the slew keys 62 are depressed the process increments or decrements the proposed value for the 16 byte Short Index System Variable by one. If the on/off key 64 is depressed, the process updates the RAM system variable with the proposed new Short-Index and updates the non-volatile memory based upon the RAM and then goes to the Program Select Mode. If the $X_2$ key 66 is depressed the process displays "Sh" for one second and then displays the proposed Short Index Value. In the display of the Short Index Value the high byte is displayed for one second then the low byte. If the belt key 68 is depressed the conveyor belt short index encoder pulses are indexed. If the door key 70 is pressed the process returns to the mode which it was previously in prior to entry of the Program Select Mode, either the Automatic Mode or the Manual Mode. If the program key 72 is pressed the process returns to the Program Select Mode.

Upon initial entry into the Long Index Programming Mode, the display first shows "Lo" for one second and then shows the high byte of the actual Long-Index System Variable for one second and finally shows the low byte of the actual Long-Index System Variable. For the remainder of this mode, unless otherwise noted, the display shows the low byte of the proposed new value for the Long-Index System Variable. If the slew keys 62 are depressed, the process increments or decrements the proposed value for the 16 byte Long-Index System Variable by one. If the on/off key 64 is depressed, the process updates the RAM system variable with the proposed long-index and updates the non-volatile memory base on the RAM and finally goes to the Program Select Mode. If the $X_2$ key is depressed, the process displays "Lo" for one second and then displays the proposed long-index value, first the high byte for one second and then the low byte. If the belt key 68 is depressed the process indexes the conveyor belt long index encoder pulses, If the door key 70 is depressed the process returns to the mode in which it was originally in prior to entry into the Program Select Mode, either the Automatic Mode or the Manual Mode. If the program key 72 is depressed the process returns to the Program Select Mode.

In the System Variable Selection Mode the display shows the numeric value associated with the selected systems variable. The following chart shows the Display Index, the System Variable Name and the description.

| DISPLAY INDEX | SYSTEM VARIABLE NAME | DESCRIPTION |
|---|---|---|
| 0. | sleep (high) | Inactive time before entering the |
| 1. | sleep (low) | sleep state |
| 2. | purge (high) | Time between purges while unit is |
| 3. | purge (low) | in the sleep state |
| 4. | purge door cycles | Door cycles between purges |
| 5. | purge duration | Duration of purge |
| 6. | keypad tone | Duration of keypad feedback |
| 7. | eoc tone | Duration of end of cycle tone |
| 8. | error tone | Duration of error time |
| 9. | warm up dly | Filament warming time |
| 10. | eyel blocked dly | Eye #1 blocked to belt on |
| 11. | index in dly | Belt off to doors close |
| 12. | door jam | Doors close to switches close |
| 13. | drclose dly | Switches close to relays close |
| 14. | relay dly | Relays close to triacs on |
| 15. | triac dly | Triacs off to relays open |
| 16. | dropen dly | Doors open to belt on |
| 17. | key debounce | Keypad debounce time |
| 18. | door debounce | Door switch debounce time |
| 19. | min slew | Min. time between slew keys |
| 20. | max slew | Max. time between slew keys |

If the slew keys 62 are depressed, the system increments or decrements selected process variables by one. If the on/off key 64 is depressed the process returns to the System Variable Programming Mode. If the door key 70 is depressed the process returns to the mode in which it was originally in prior to entering the Program Select Mode, either the Automatic Mode or the Manual Mode. If the program key 72 is depressed, the system returns to the Program Select Mode.

In the System Variable Programming Mode the display shows the proposed new value for the selected system variable. If the slew keys 62 are depressed, the process increments or decrements the proposed value for the selected system variable by one. If the on/off key 64 is depressed, the process copies the proposed value to selected system variables in RAM and updates the non-volatile memory based upon the RAM and goes to the System Variable Select Mode. If the door key 70 is depressed, the process returns to the mode in which it was originally prior to entry into the Program Select Mode, either the Automatic Mode or the Manual Mode. If the program key is depressed, the process returns to the Program Select Mode.

In the Purge Duration Programming Mode the display shows the proposed new value for the Purge-Duration System Variable. If the slew keys 62 are depressed, the process increments or decrements the proposed value for the Purge-Duration System by one. If the on/off key 64 is depressed the process copies the proposed value to Purge Duration System Variable into RAM and updates the non-volatile memory based upon RAM and goes to the System Variable Selection Mode. If the $X_2$ key 66 is depressed, the pressure tank purge is started or stopped. If the door key 70 is depressed, the process returns to the mode in which it was originally in prior to entry to the Program Select Mode, either the Automatic Mode or the Manual Mode. If the program key 72 is depressed, the processed returns to the Program Select Mode.

In the Reset Default Values Mode if the slew key 62, the on/off key 64 or the door key 70 is depressed the process returns to the mode in which it was originally in prior to the Program Select Mode, either the Automatic Mode or the Manual Mode. If the $X_2$ key 66 is depressed, the process updates non-volatile memory based upon the Default System Variable stored in ROM and resets the control system. If the program key 72 is depressed the process returns to the Program Select Mode.

In the preferred embodiment, the front and rear oven doors use an orthogonal electromagnetic seal which is described in copending U.S. Patent Application entitled "A Microwave Oven Having An Orthogonal Electromagnetic Seal" by Thomas Miller and Larry Engebritson, filed Sep. 8, 1997, assigned to Amana Corporation (AMNA:013), is hereby incorporated by reference in its entirety.

It will be understood that various changes in the details, arrangements and configurations of the parts and assemblies which have been described and illustrated above in order to explain the nature of the present invention may be made by those skilled in the art within the principle and scope of the present invention as expressed in the appended claims. The foregoing description of the invention has been presented for purpose of illustration and description. It is not intended to limit the invention to the precise forms disclosed, and many modifications and variations are possible in light of the above teachings.

What is claimed is:

1. A pass through oven system comprising:

a oven having an internal cavity capable of receiving an item to be heated;

a conveyor system having a belt which passes through the cavity and a motor for moving the belt;

a sensor system for detecting and identifying the item to be heated and providing output signals, the sensor system including a first sensor for detecting the item to be heated on the conveyor belt and providing a first output signal and a second sensor for detecting the item to be heated on the conveyor belt at the point of entry into the oven cavity and providing a second output signal;

a controller receiving the first and second output signals and providing a move signal to the conveyor system to move the belt a distance sufficient to place the item to be heated within the cavity and providing a heat output signal to the oven to operate the oven based upon the item identified; and the controller receives the first and second output signals and in response thereto determines the amount of time to provide the move signal to operate the motor to position the item to be heated at the center of the cavity.

2. A pass through oven system as set forth in claim 1 wherein the sensor system further includes:

a third sensor for identifying the item to be heated and providing a third output signal.

3. A pass through oven system as set forth in claim 2 wherein said controller receives said third output signal and in response thereto provides said heat output signal to operate said oven based upon the item identified.

4. A pass through oven system as set forth in claim 1 wherein said oven is a microwave oven.

5. A pass through oven system as set forth in claim 4 wherein the microwave oven has an automatically operated front door and an automatically operated rear door and further comprising:

a front door sensor for detecting when the front door is closed and for providing a front door closed signal to the controller and the controller uses the front door closed signal in determining when to operate the automatic front door; and a rear door sensor for detecting when the rear door is closed and for providing a rear door closed signal to the controller and the controller uses the rear door closed signal in determining when to operate the automatic rear door.

6. A pass through oven system as set forth in claim 5 wherein said controller receives said front door closed signal and said rear door closed signal before providing said heat output signal to said oven.

7. A method for controlling a pass through oven system having a oven with a cavity, a conveyor system having a belt which passes through the oven cavity and a motor for moving the belt, a sensor system for detecting and identifying an item to be heated and a controller for operating the conveyor system and the oven, comprising the steps of:

detecting the presence of an item to be heated on the conveyor belt;

determining the distance the conveyor belt must travel to position the item to be heated within the oven cavity;

moving the conveyor belt to position the item to be heated within the oven cavity;

identifying the item to be heated;

stopping the conveyor belt; and automatically operating the oven for a predetermined length of time depending upon the identity of the item to be heated.

8. A method for controlling a pass through oven system as set forth in claim 7 further comprising the following step:

after the oven operation ceases, moving the conveyor belt to position the heated item outside the oven cavity.

9. A method for controlling a pass through oven system as set forth in claim 8 wherein the oven has a front door and a rear door, said method further comprising the following steps:

closing the oven doors after the item to be heated is positioned inside the oven cavity;

determining if the oven doors have closed properly; and operating the oven only if the oven doors have closed properly.

10. A method for controlling a pass through oven system as set forth in claim 9 further comprising the following steps:

opening the oven doors if the oven doors have not closed properly;

moving the conveyor belt a short distance to remove any obstruction that might have prevented the oven doors from closing properly; and repeating the steps set forth in claim 9.

* * * * *